United States Patent [19]

Brown et al.

[11] Patent Number: 5,519,098
[45] Date of Patent: May 21, 1996

[54] ACTIVATION OF CATALYST IN ETHYLENE POLYMERIZATION AT HIGH TEMPERATURES

[75] Inventors: Stephen J. Brown, Elginburg; Reginald K. Ungar; Vaclav G. Zboril, both of Kingston, all of Canada

[73] Assignee: Novacor Chemicals (International) SA, Villars-sur-Glâne, Switzerland

[21] Appl. No.: 321,555

[22] Filed: Oct. 12, 1994

Related U.S. Application Data

[63] Continuation-in-part of Ser. No. 70,368, filed as PCT/CA92/00419, Sept. 25, 1992, abandoned.

[30] Foreign Application Priority Data

Oct. 3, 1991 [GB] United Kingdom ............ 9121019

[51] Int. Cl.$^6$ ............................................. C08F 4/654
[52] U.S. Cl. ................ 526/116; 526/124.7; 526/124.8; 526/142; 526/144; 526/153; 502/113; 502/115
[58] Field of Search ............................ 526/116, 142, 526/144, 153, 124.7, 124.8

[56] References Cited

U.S. PATENT DOCUMENTS

| | | | |
|---|---|---|---|
| 4,250,288 | 2/1981 | Lowery, Jr. et al. | 526/137 |
| 4,342,855 | 8/1982 | Akimoto et al. | 526/124 |
| 4,612,300 | 9/1986 | Coleman, III | 502/113 |
| 4,681,924 | 7/1987 | Harris et al. | 526/125 |
| 4,704,376 | 11/1987 | Blenkers et al. | 502/104 |
| 4,769,428 | 9/1988 | Zboril et al. | 526/84 |

FOREIGN PATENT DOCUMENTS 0280353 8/1988 European Pat. Off.

*Primary Examiner*—Romulo H. Delmendo
*Attorney, Agent, or Firm*—Bruce E. Harang

[57] ABSTRACT

The present invention relates to a method for activating coordination catalysts suitable for the polymerization of alpha olefins using a alkoxy aluminum alkyl compound prepared by mixing an alcohol and an alkyl aluminum. The activator retains its activity and is easy to prepare simplifying the polymerization process.

4 Claims, No Drawings

ACTIVATION OF CATALYST IN ETHYLENE POLYMERIZATION AT HIGH TEMPERATURES

This is a continuation-in-part of application Ser. No. 08/070,368 filed Jun. 3, 1993, now abandoned and International Application PCT/CA92/00419 filed on Sep. 25, 1992.

FIELD OF THE INVENTION

The present invention relates to a process and catalyst for the preparation of polymers of ethylene, especially homopolymers of ethylene and copolymers of ethylene and higher alpha-olefins. In particular, the invention relates to a polymerization process carried out in solution for the preparation of such polymers in which the process is operated at a temperature of at least 180° C., and the catalyst is activated with an alkoxy alkyl aluminum compound.

Polymers of ethylene, for example, homopolymers of ethylene and copolymers of ethylene and higher alpha-olefins, are used in large volumes for a wide variety of end-uses, for example, in the form of film, fibres, moulded or thermoformed articles, pipe coatings and the like.

BACKGROUND OF THE INVENTION

There are two types of processes for the manufacture of polyethylene that involve the polymerization of monomers in an inert liquid medium in the presence of a coordination catalyst viz. those which operate at temperatures below the melting or solubilization temperature of the polymer and those which operate at temperatures above the melting or solubilization temperature of the polymer. The latter are referred to as "solution" processes, an example of which is described in Canadian Patent 660,869 of W. W. Anderson, E. L. Fallwell and J. M. Bruce, which issued Apr. 9, 1963. In a solution process, the process is operated so that both the monomer and polymer are soluble in the reaction medium. Accurate control over the degree of polymerization, and hence the molecular weight of the polymer obtained, may be achieved by control of the reaction temperature. In solution polymerization processes, it is advantageous to operate the process at very high temperatures e.g.>250° C., and to use the heat of polymerization to flash off solvent from the polymer solution obtained.

While steps may be taken to remove catalyst from the polymer subsequent to the polymerization step in the process, it is preferred that a solution polymerization process be operated without catalyst removal step. Thus, catalyst will remain in the polymer. Such catalyst, which may be referred to as "catalyst residue", may contribute to the colour of the polymer obtained and to degradation of the polymer during or subsequent to processing of the polymer. The amount of catalyst residue is related, at least in part, to the overall activity of the catalyst employed in the polymerization step of the process as the higher the overall activity of the catalyst the less catalyst that is, in general, required to effect polymerization at an acceptable rate. Catalysts of relatively high overall activity are therefore preferred in solution polymerization processes.

Two important factors in determining the overall activity of a catalyst are the instantaneous activity of the catalyst and the stability of the catalyst under the operating conditions, especially at the operating temperature. Many catalysts that are stated to be very active in low temperature polymerization processes also exhibit high instantaneous activity at the higher temperatures used in solution processes, but tend to decompose within a very short time in a solution process, with the result that the overall activity is disappointingly low. Such catalysts are of no commercial interest for solution processes. Other catalysts may exhibit acceptable overall activity at the higher temperatures of a solution process but show tendencies to yield polymers of broad molecular weight distribution or of too low a molecular weight to be commercially useful for the manufacture of a wide range of useful products. Thus, the requirements for and the performance of a catalyst in a solution polymerization process are quite different from those of a catalyst in a low temperature polymerization process, as will be understood by those skilled in the art.

The preparation of polymers of ethylene in solution polymerization processes is described in published PCT patent application No. WO 91/17193 of D. J. Gillis, M. C. Hughson and V. G. Zboril, published Nov. 14, 1991 and in the patent applications referred to therein. Catalysts activated by siloxalanes are capable of polymerizing ethylene at very high temperatures. However, the siloxalane residues from such catalysts tend to significantly adversely affect the performance or adsorbers used to purify solvent in the associated solvent recovery and recycle sections of the polymerization process.

There is extensive prior art on the use of various electron donors as adjuncts to Ziegler-Natta catalysts in low (less than 90° C.) temperature polymerization of ethylene and other alpha-olefins, to increase the activity and/or stereospecificity of the catalyst. Esters of aromatic acids e.g. toluic or benzoic acid, ethers and alcohols are frequently used for that purpose. However, most electron donors that are useful at low temperatures destroy catalyst activity as the polymerization temperature increases. As an example of the use of electron donors, U.S. Pat. No. 4,097,659 of H. M. J. C. Creemers et al., issued Jun. 27, 1978 discloses a low temperature polymerization process, operating in an inert solvent at temperatures in the range of 20°–100° C., in which the list of examples of activators includes dimethylmonobutoxy aluminum, monodecylpropoxy aluminum chloride and monobutyl monobutoxy aluminum hydride.

As exemplified hereinafter, substitution of even part of trialkylaluminum with alkoxy alkylaluminum of the type used in U.S. Pat. No. 4,097,659 results in a substantial decrease in catalyst activity even if the temperature is only 130° C. i.e. in the lowest temperature range of operation of a solution polymerization process. Surprisingly, it has now been found that at higher temperatures this trend to decreased catalytic activity is reversed and alkoxyalkyl aluminum activated catalysts exhibit superior activity at temperatures above about 180° C.

European Patent application 0 280 353 assigned to Stamicarbon B.V. published Aug. 31, 1988 discloses a catalyst which comprises a very broad number of possibilities for forming a catalyst in terms of the various components in the catalyst. However, the patent application teaches a first component relatively rich in aluminum and chlorine. The preferred ratio of Cl/Mg is greater than 3, preferably greater than 5 (page 3 line 26) which is greater than the Cl/Mg ratio in the catalysts of the present invention. Further the Stamicarbon disclosure does not teach catalysts comprising a vanadium component which come within the scope of the present invention. Accordingly, the Stamicarbon reference teaches away from the subject matter of the present patent application.

SUMMARY OF THE INVENTION

Accordingly, the present invention provides in a solution polymerization process for the polymerization of polymers of alpha-olefins selected from the group consisting of homopolymers of ethylene and $C_3$–$C_{12}$ alpha olefins by the polymerization of ethylene or a mixture of ethylene and one or more $C_3$–$C_{12}$ alpha olefins in the presence of a catalytic amount of a titanium-containing coordination catalyst in an inert solvent at a temperature from 180°–320° C., and at a pressure from 4–20 MPa the improvement characterized in that the coordination catalyst is activated with an activator is selected from the group consisting of alkoxyaluminum alkyl compounds of the formula $AlR'_m OR''_{3-m}$ and mixtures of said alkoxyaluminum alkyl compounds and an alkyl aluminum compound of the formula $AlR_n X_{3-n}$ wherein R, R' and R" may be the same or different and are independently selected from the group consisting of alkyl or aryl radicals containing from 1 to 20 carbon atoms, X is halogen, n is an integer from 1–3 and m is 0–2.

The present invention further provides a solution polymerization process for the preparation of useful polymers of alpha-olefins selected from the group consisting of homopolymers of ethylene and $C_3$–$C_{12}$ alpha olefins which polymers have a melt index as determined by ASTM D 1238 (190° C./2.16 kg) of up to 200 which comprises feeding a monomer mixture selected from the group consisting of one or more of ethylene and $C_3$–$C_{12}$ alpha olefins; a coordination catalyst and an inert hydrocarbon solvent to a reactor and polymerizing said monomer mixture at a temperature from 180° to 320° C. and a pressure from 4–20 MPa and recovering the polymer so obtained wherein said coordination catalysts is formed from a catalyst precursor comprising titanium and a catalyst activator selected from the group consisting of alkoxyaluminum alkyl compounds of the formula $AlR'_m OR''_{3-m}$ and mixtures of said alkoxyaluminum alkyl compound and an alkyl aluminum compound of the formula $AlR_n X_{3-n}$ wherein R, R' and R" may be the same or different and are independently selected from the group consisting of alkyl or aryl radicals containing from 1 to 20 carbon atoms, X is halogen, n is an integer from 1–3 and m is 1 or 2.

DETAILED DESCRIPTION

There are a number of types of polymers of alpha olefins which may be made. For example the polymer may be a liquid polymer or a waxy polymer having a low molecular weight. On the other hand the polymer may have a very high molecular weight and have excellent physical properties but be extremely difficult to process. The present invention is directed to "useful" polymers of alpha olefins. In practical terms the polymer should have a melt index as determined by ASTM D 1238 (190° C./2.16 kg) of up to 200 dg/min. ASTM means the American Standard Test Method and the conditions of the test are at 190° C. and under a load of 2.16 kg. While the melt index may be fractional the lowest melt index would be that useful for extrudable polymers. Typical ranges would include melt indexes from 0.1 to 150, most typically from 0.1 to 120 dg/min.

In a preferred embodiment of the process of the invention in the activator R is alkyl of 2–8 carbon atoms, n=3, each of R' and R" is alkyl of 2–8 carbon atoms and m=2.

In an embodiment of the process of the invention, the second component (or the activator) is in the form of a mixture of trialkyl aluminum and an alcohol in which the amount of alcohol is less that the stoichiometric amount to form dialkyl alkoxy aluminum, especially in which the trialkyl aluminium is $AlR^3_3$ in which each $R^3$ is an alkyl group having 1–10 carbon atoms and the alcohol is of the formula $R^4OH$ in which $R_4$ is an alkyl or aryl radical of 1–20 carbon atoms, especially alkyl of 1–16 carbon atoms. The molar ratio of alcohol to alkyl aluminum mixed to produce the activator (or second component) may be from 0.01:1 to 1.2:1, preferably from 0.5:1 to 1:1.

In one embodiment of the process, the first component or the precursor is formed from:
(i) a mixture of $MgR^1_2$ and $AlR^2_3$ in which each $R^1$ and $R^2$ are the same or different and each is independently selected from alkyl groups having 1–10 carbon atoms;
(ii) a reactive chloride component, preferably selected from the group consisting of HCl, t-butyl chloride, and benzyl chloride; and (iii) titanium compound, preferably selected from the group consisting of titanium tetrachloride and titanium tetrabromide. Most preferably the ratio of Mg:Ti is from 4:1 to 8:1, the ratio of halide:Mg is from 1.9:1 to 2.6:1 and the atomic ratio of Mg:Al is from 1.0:0.1 to 1.0:0.4.

The precursor may be obtained by mixing a solution of the components of the precursor in an inert solvent for a period of up to 5 seconds and holding the resulting admixture at a temperature of 30° C. or less for a period of time from 5 seconds to 60 minutes, preferably for a period of time from 5 seconds to 1 minute, and then heating the admixture to a temperature of 150° to 300° C., preferably from 170° to 220° C. for a period of time from 5 seconds to 60 minutes, preferably for a time from 10 seconds to 2 minutes.

Alternatively, the first component of the coordination catalyst may be formed by rapidly admixing a solution of a titanium tetrahalide, optionally containing vanadium oxytrihalide, and with organoaluminum compound e.g. trialkyl aluminum or dialkyl aluminum halide, for a period of up to 5 seconds and holding the resulting admixture at a temperature of less than 30° C., for a period of time from 5 seconds to 60 minutes, preferably for a time from 5 seconds to 1 minute, and heating the resultant admixture to a temperature of 150°– 300° C., preferably from 170° to 220° C. for a period of 5 seconds to 60 minutes, preferably from 10 seconds to 2 minutes.

Preferably the molar ratio of vanadium oxytrihalide to Ti is from 1:6 to 4:1, most preferably from 1:2 to 2:1. It should be noted that in the embodiment when vanadium oxytrihalide is present magnesium need not be present in the precursor or catalyst.

In a further embodiment, the forming of the first and second catalyst components and the admixing thereof are carried out in-line at a temperature of less than 30° C.

The present invention is directed to a process for the preparation of useful polymers of alpha-olefins, such polymers being intended for fabrication into articles by extrusion, injection moulding, thermoforming, rotational moulding and the like. In particular, the polymers of alpha-olefins are homopolymers of ethylene and copolymers of ethylene and higher alpha-olefins i.e. alpha-olefins of the ethylene series, especially such higher alpha-olefins having 3 to 12 carbon atoms i.e. $C_3$–$C_{12}$ alpha-olefins, examples of which are 1-butene, 1-hexene, and 1-octene. The preferred higher alpha olefins have 4–10 carbon atoms. In addition cyclic endomethlenic dienes may be fed to the process with the ethylene or mixtures of ethylene and $C_3$–$C_{12}$ alpha-olefin. Such polymers are known.

In the process of the present invention, monomer, a coordination catalyst and inert hydrocarbon solvent and optionally hydrogen are fed to a reactor. The monomer may be ethylene or mixtures of ethylene and at least one $C_3$–$C_{12}$ higher alpha-olefin, preferably ethylene or mixtures of ethylene and at least one $C_4$–$C_{10}$ higher alpha-olefin; it will be understood that the alpha-olefins are hydrocarbons.

The coordination catalyst is formed from two components viz. a first component and a s second component. The first component contains titanium or admixtures thereof with other transition metals in lower than maximum valency, and is and organometallic component of the type typically used in solution polymerization processes. The first component may be in a solid form. Examples of the first component have been given above.

The second component is a solution of an alkoxyalkyl aluminum or a mixture of aluminum alkyl and alkoxy alkyl aluminum in inert solvent; the ratio of aluminum alkyl to alkoxy alkyl aluminum in the mixture may be used to control the process. The aluminum alkyl is of the formula $AlR_nX_{3-n}$ and the alkoxy alkyl aluminum (sometimes also called alkoxy aluminum alkyl) is of the formula $AlR'_mOR''_{3-m'}$, in which each R, R' and R" is alkyl or aryl of 1–20 carbon atoms, X is halogen especially fluorine, chlorine or bromine, n is 1–3 and m is 2. The preferred halogen is chlorine.

The alkoxy aluminum alkyl may be prepared by admixing the corresponding alkyl aluminum with the corresponding alcohol, so as to form the alkoxy aluminum alkyl. Preferably, the alkyl aluminum is the same as the aluminum alkyl in the second component. In fact, the preferred method of forming the second component is to add the alcohol to the alkyl aluminum in less than the stoichiometric amount required to convert all of the alkyl aluminum to alkoxy aluminum alkyl (i.e. in a molar ratio of alcohol to aluminum compound from 0.01:1 to 1.2:1). The mixing may be conveniently carried out in-line at a temperature of less than 30° C., permitting reaction to occur for some minimum time. This time depends on the type and reactivity of the components used to prepare a particular catalyst. As exemplified hereinafter, feeding alcohol directly to the reactor in the polymerization process is detrimental to the polymerization process.

The mole ratio of the alcohol to the alkyl aluminum used to achieve control of the polymerization process is in the range of 0.01:1 to 1.2:1 preferably 0.5:1 to 1.2:1, most preferably 0.5:1 to 1:1 (alcohol: aluminum).

The concentration of the components of the solutions used in the preparation of the catalyst is not critical and is primarily governed by practical considerations. Concentrations of as low as 25 ppm, on a weight basis, may be used but higher concentrations, for example 100 ppm and above, are preferred.

As exemplified hereinafter, the sequence of steps in the preparation of the catalyst is important in obtaining a catalyst with high activity.

The coordination catalyst described herein is used in the process of the invention without separation of any of the components of the catalyst. In particular, neither liquid nor solid fractions are separated from the catalyst before it is fed to the reactor. In addition, the catalyst and its components are not slurries. All the components are easy-to-handle, storable stable liquids.

The solvent used in the preparation of the coordination catalyst is an inert hydrocarbon, in particular a hydrocarbon that is inert with respect to the coordination catalyst. Such solvents are known and include for example, hexane, heptane, octane, cyclohexane, methylcyclohexane, and hydrogenated naphtha. The solvent used in the preparation of the catalyst is preferably the same as that fed to the reactor for the polymerization process.

The first component of the catalyst described herein may be used, according to the process of the present invention, over the wide range of temperatures that may be used in an alpha-olefin polymerization process operated under solution conditions. For example such polymerization temperatures may be in the range of 105°–320° C. and especially in the range of 105°–310° C. However, as exemplified hereinafter, the activator is particularly effective at temperatures of at least 180° C., and thus the process of the invention is operated, at least in part at such elevated temperatures.

The pressures used in the process of the present invention are those known for solution polymerization processes, for example, pressures in the range of about 4–20 MPa.

In the process of the present invention, the alpha-olefin monomers are polymerized in the reactor in the presence of the catalyst. Pressure and temperature are controlled so that the polymer formed remains in solution.

Small amounts of hydrogen, for example 1–100 parts per million, based on the total solution fed to the reactor may be added to the feed in order to improve control of the melt index and/or molecular weight distribution and thus aid in the production of a more uniform product, as is disclosed in Canadian Patent 703,704.

The solution passing from the polymerization reactor is normally treated to deactivate any catalyst remaining in the solution. A variety of catalyst deactivators are known, examples of which include fatty acids, alkaline earth metal salts of aliphatic carboxylic acids, alcohols and trialkanolamines, an example of which is triisopropanolamine.

The hydrocarbon solvent used for the deactivator is preferably the same as the solvent used in the polymerization process. If a different solvent is used, is must be compatible with the solvent used in the polymerization mixture and not cause adverse effects on the solvent recovery system associated with the polymerization process.

After deactivation or the catalyst, the solution containing polymer may be passed through a bed of activated alumina or bauxite which removes part or all of the deactivated catalyst residues and/or other impurities. It is, however, preferred that the process be operated without removal of deactivated catalyst residues. The solvent may then be flashed off from the polymer, which subsequently may be extruded into water and cut into pellets or other suitable comminuted shapes. The recovered polymer may then be treated with saturated steam at atmospheric pressure to, for example reduce the amount of volatile materials and improve polymer colour. The treatment may be carried out for about 1 to 6 hours, following which the polymer may be dried and cooled with a stream of air for 1 to 4 hours. Pigments, antioxidants, UV screeners, hindered amine light stabilizers and other additives may be added to the polymer either before or after the polymer is formed into pellets or other comminuted shapes.

The antioxidant incorporated into polymer obtained from the process of the present invention may, in embodiments, be a single antioxidant e.g. hindered phenolic antioxidant, or a mixture of antioxidants e.g. a hindered phenolic antioxidant combined with a secondary antioxidant e.g. phosphite. Both types of antioxidant are known in the art. For example the ratio of phenolic antioxidant to secondary antioxidant may be in the range of 0.1:1 to 5:1 with the total amount of antioxidant being in the range of 200 to 3000 ppm.

The process of the present invention may be used to prepare homopolymers of ethylene and copolymers of ethylene and higher alpha-olefins having densities in the range of, for example, about 0.900– 0.970 $g/cm^3$ and especially 0.915–0.965 $g/cm^{3;}$ the polymers of higher density e.g. about 0.960 and above, being homopolymers. Such polymers may have a melt index, as measured by the method of ASTM D-1238, condition E, in the range of for example, 0.1–200 dg/min, typically from about 0.1 to 150 dg/min., and especially in the range of about 0.1 to 120 dg/min. The polymers may be manufactured with narrow or broad molecular weight distribution. For example, the polymers may have a stress exponent, a measure of the molecular weight distribution, in the range of about 1.1–2.5 and especially in the range of about 1.3–2.0.

Stress exponent is determined by measuring the throughput of a melt indexer at two stresses (2160 g and 6480 g loading) using the procedures of the ASTM melt index test method, and the following formula:

$$\text{Stress exponent} = \frac{1}{0.477} \cdot \frac{\log(\text{wt. extruded with 6480 g wt.})}{(\text{wt. extruded with 2160 g wt.})}$$

Stress exponents values of less than about 1.40 indicate narrow molecular weight distribution while values above about 1.70 indicate broad molecular weight distribution.

The polymers produced by the process of the present invention are capable of being fabricated into a wide variety of articles, as is known for homopolymers of ethylene and copolymers of ethylene and higher alpha-olefins.

Unless otherwise noted, in the examples hereinafter the following procedures were used:

The reactor was a 81 mL free-volume (regular internal shape, with the approximate dimensions of 15×90 mm) pressure vessel fitted with six regularly spaced internal baffles. The vessel was fitted with a six blade turbine type impeller, a heating jacket, pressure and temperature controllers, three feed lines and a single outlet. The feed lines were located on the top of the vessel, each at a radial distance of 40 mm from the axis, while the outlet line was axial with the agitator drive shaft. The catalyst precursors and other reagents were prepared as solutions in cyclohexane which had been purified by passage through beds of activated alumina, molecular sieves and silica gel prior to being stripped with nitrogen.

Ethylene was metered into the reactor as a cyclohexane solution prepared by dissolving purified gaseous ethylene in purified solvent. The feed rates of the catalyst components were adjusted to produce the desired conditions in the reactor. The desired hold-up times in the catalyst lines were achieved by adjusting the length of the tubing through which the components were passed. The hold-time in the reactor was held constant by adjusting the solvent flow to the reactor such that the total flow remained constant. The reactor pressure was maintained at 7.5 MPa and the temperature and flows were held constant during each experiment.

The initial (no conversion) monomer concentration in the reactor was 3–4 wt %. A solution of deactivator viz triisopropanolamine or nonanoic acid, in toluene or cyclohexane was injected into the reactor effluent at the reactor outlet line. The pressure of the stream was then reduced to about 110 kPa (Abs.) and the unreacted monomer was monitored by gas chromatography. The catalyst activity was defined as $KP=(Q/(1-Q)(1/HUT)$ (1/catalyst concentration)

Where Q is the fraction of the ethylene monomer converted to polymer, HUT is the reactor hold up time expressed in minutes and the catalyst concentration in the reaction vessel expressed in mmol/l and corrected for impurities. The catalyst concentration is based on the sum of the transition metals. The polymerization activity (Kp) was calculated.

The present invention is illustrated by the following, non-limiting, examples. Unless stated to the contrary, in each example the solvent used was cyclohexane, the monomer was ethylene and the reactor hold-up time was held constant at 3.0 min.

EXAMPLE 1

The catalyst was prepared by the in-line mixing at ambient temperature (approximately 30° C.) of solutions of each of dibutyl magnesium, triethyl aluminum, tert. butyl chloride and titanium tetrachloride in cyclohexane, followed by the addition of further solution of triethyl aluminum in cyclohexane. The concentration and flows of each species were adjusted such that the following mole ratios were obtained:

chlorine (from tert. butyl chloride)/Magnesium=2.4;

magnesium/titanium=5.0;

aluminum (first triethyl aluminum)/titanium=0.9; and aluminum (second triethyl aluminum)/titanium=3.0.

The reactor polymerization was operated at a temperature of 230° C., as measured in the reactor. The solution passing from the reactor was deactivated and the polymer recovered, as described above. Catalyst activity (Kp) was calculated and the results obtained are shown in Table 1. The ratios reported for Cl/Mg and $Al^2$/Mg are the optimized ratios required in order to obtain maximum catalyst activity at the indicated ratios of Mg/Ti and $Al^1$/Ti.

In Runs 2 and 3, the catalyst preparation was as above with the exception that one mole equivalent of tert butyl alcohol (per mole of $Al^2$ was added to the second aliquot of triethyl aluminum (thus forming the alkoxide).

TABLE 1

| Run No. | Ratio Cl/Mg | Ratio Mg/Ti | Ratio $Al^1$/Ti | Ratio $Al^2$/Ti | Alcohol | Temp °C. | Kp |
| --- | --- | --- | --- | --- | --- | --- | --- |
| 1 | 2.4 | 5.0 | 0.9 | 3.0 | none | 230 | 13.9 |
| 2 | 2.2 | 5.0 | 0.9 | 6.0 | t-butanol | 230 | 31.7 |
| 3 | 2.4 | 5.0 | 0.9 | 3.0 | t-butanol | 230 | 4.8 |
| 4 | 2.3 | 5.0 | 0.9 | 3.0 | phenol | 230 | 30.4 |
| 5 | 2.2 | 5.0 | 0.9 | 3.0 | ethanol | 230 | 24.9 |
| 6 | 2.3 | 5.0 | 0.9 | 4.5 | n-decanol | 230 | 24.1 |
| 7 | 2.2 | 5.0 | 0.9 | 3.0 | neo-pentyl alcohol | 230 | 29.3 |
| 8 | 2.3 | 5.0 | 0.9 | 6.0 | t-butanol[3] | 230 | 2.7 |

Note.
[1]ratio of triethyl aluminum to titanium at first addition.
[2]ratio of triethyl aluminum or alkoxydiethyl aluminum to titanium at second addition.
Kp calculated polymerization rate constant l/mmol/min.
[3]t-butanol added to the reactor rather than the catalyst (feed line e.g. no in line mixing)

Runs 1,2 and 3 illustrate that the ratios of the catalyst components for the alkoxide systems have significant effects on the increase in activity, which is expected to vary with the type and composition of the other catalyst components and the mode of operation of the process but nonetheless illustrates that increases in catalytic activity of greater than a factor of two are obtainable. Run 3 cf. 2 illustrates that catalyst activity is sensitive to ratios of components, which may be used in the control of the process.

Runs 4, 5, 6 and 7 illustrate the use of alcohols other than tert butanol.

Run 8 illustrates the detrimental effect of the addition of the alcohol directly to the reactor, rather than to the second triethyl aluminum stream. This indicates that prior formation of the alkoxdialkyl aluminum species is necessary.

EXAMPLE II

As a comparison with other known activators for high temperature polymerization processes, the procedure of Example I was repeated using the activators and reaction temperatures indicated in Table II. The results obtained were as follows.

TABLE II

| Run No. | Ratio Cl/Mg | Ratio Mg/Ti | Ratio Al$^1$/Ti | Ratio Al$^2$/Ti | Activator | Temp °C. | Kp |
|---|---|---|---|---|---|---|---|
| 9 | 2.3 | 5.0 | 0.9 | 6.0 | BUO-DEAL | 200 | 93.7 |
| 10 | 2.2 | 5.0 | 0.9 | 6.0 | BUO-DEAL | 230 | 31.7 |
| 11 | 2.3 | 5.0 | 0.9 | 6.0 | BUO-DEAL | 260 | 7.4 |
| 12 | 2.3 | 5.0 | 0.9 | 3.0 | DESI | 200 | 155.7 |
| 13 | 2.3 | 5.0 | 0.9 | 3.0 | DESI | 230 | 35.4 |
| 14 | 2.4 | 5.0 | 0.9 | 3.0 | DESI | 260 | 9.1 |
| 15 | 2.2 | 5.0 | 0.9 | 1.5 | DIBALO | 200 | 58.0 |
| 16 | 2.3 | 5.0 | 0.9 | 1.5 | DIBALO | 230 | 16.2 |
| 17 | 2.2 | 5.0 | 0.9 | 1.5 | DIBALO | 260 | 2.8 |
| 18 | 2.2 | 5.0 | 0.9 | 1.5 | TEAL | 230 | 13.9 |

BUODEAL t-butoxydiethyl aluminum
DESI diethylaluminum ethyldimethylsiloxalane
DIBALO diisobutylaluminoxane
TEAL triethyl aluminum
$^1$mole ratio of triethyl aluminum to titanium
$^2$mole ratio of activator to titanium.
Kp l/mmol/min This example shows the relative improvement in catalyst activity at the higher temperatures that is exhibited by t-butoxydiethyl aluminum compared with the other activators.

EXAMPLE III

The catalyst was prepared from solutions of titanium tetrachloride, vanadium oxytrichloride and diethylaluminum chloride in cyclohexane. The admixed solutions were heat treated at 205°–210° C. for 110–120 seconds by admixing with hod cyclohexane solvent. The activator was then added to activate the catalyst. The polymerization reactor was run at the temperature indicated in Table 3. The solution passing form the reactor was deactivated and the polymer recovered as described above. The catalyst activity was calculated. The results obtained were as follows; in each run, (moles Ti)/(moles V)=1.

TABLE III

| Run No. | Ratio Al$^1$/(Ti + V) | Ratio Al$^2$/(Ti + V) | Activator | Temp °C. | Kp |
|---|---|---|---|---|---|
| 19 | 1.0 | 4.0 | TEAL | 200 | 72.8 |
| 20 | 1.1 | 2.0 | TEAL | 230 | 20.0 |
| 21 | 1.1 | 2.0 | TEAL | 260 | 5.3 |
| 22 | 1.1 | 2.7 | DESI | 230 | 33.1 |
| 23 | 1.0 | 2.7 | DESI | 260 | 11.5 |
| 24 | 1.0 | 1.3 | DIBALO | 200 | 71.7 |
| 25 | 1.0 | 1.3 | DIBALO | 230 | 21.7 |
| 26 | 1.0 | 1.3 | DIBALO | 260 | 6.4 |
| 27 | 1.0 | 2.0 | DECOXY-DIETHYL-ALUMINUM | 200 | 123.5 |
| 28 | 1.0 | 2.0 | DECOXY-DIETHYL-ALUMINUM | 230 | 37.9 |
| 29 | 1.1 | 2.0 | DECOXY-DIETHYL-ALUMINUM | 260 | 11.7 |

DESI diethylaluminum ethyldimethylsiloxalane
DIBALO diisobutylaluminoxane
TEAL triethyl aluminum
$^1$mole ratio of diethylaluminum chloride to the sum of the titanium and vanadium.
$^2$mole ratio of the activator to the sum of the titanium and vanadium.

This example illustrates improvements obtainable using t-butoxydiethyl aluminum as activator.

EXAMPLE IV

In order to compare the use of alkoxdialkyl aluminum with other activators, the procedure of Example III was repeated using a reactor temperature of 130° C. The results were as follows.

TABLE IV

| Run No. | Al$^1$/(Ti + V) | Al$^2$/(Ti + V) | Activator | Temp °C. | Kp |
|---|---|---|---|---|---|
| 30 | 1.0 | 2.0 | TEAL | 130 | 231 |
| 31 | 1.2 | 2.7 | DESI | 130 | 89 |
| 32 | 1.1 | 2.0 | DIBALO | 130 | 292 |
| 33 | 1.0 | 3.5 | DECOXY-DIETHYL-ALUMINUM | 130 | 75 |

DESI diethylaluminum ethyldimethylsiloxalane
DIBALO diisobutylaluminoxane
TEAL triethyl aluminum
$^1$mole ratio of diethylaluminum chloride to the sum of the titanium and vanadium.
$^2$mole ratio of the activator tot ch sum of the titanium and vanadium.

This example illustrates the poor low temperature activity of the catalyst when an alkoxydialkyl aluminum is used as the activator and hence the surprising good high temperature activity.

What is claimed is:

1. A solution polymerization process for the preparation of useful polymers of alpha olefins selected from the group consisting of homopolymers of ethylene and copolymers of ethylene and one or more $C_3$–$C_{12}$ alpha olefins which polymers have a melt index as determined by ASTM D 1238 (190° C./2.16 kg) of up to 200 dg/min. which comprises feeding monomer selected from the group consisting of ethylene, and ethylene and one or more $C_3$–$C_{12}$ alpha olefins, a coordination catalyst and an inert hydrocarbon solvent to a reactor and polymerizing said monomer at a temperature from 180° to 320° C. and a pressure from 4–20 Mpa and recovering the polymer so obtained wherein said coordination catalyst is formed from a catalyst precursor comprising:

(a) a mixture of $MgR^1_2$ and $AlR^2_3$ in which $R^1$ and $R^2$ are the same or different and are independently selected from alkyl radicals having 1–10 carbon atoms;

(b) a reactive chloride component selected from the group consisting of HCl, t-butyl chloride, and benzyl chloride; and (c) a titanium compound selected from the group consisting of titanium tetrachloride and titanium tetrabromide, in which the ratio of Mg:Ti is from 4:1 to 8:1, the ratio of halide:Mg is from 1.9:1 to 2.6:1; and an atomic ratio of Mg:Al from 1.0:0.1 to 1.0:0.4; which is formed by mixing the components which form the catalyst precursor in an inert solvent for a period of time up to five seconds and holding the resultant mixture at a temperature of less than 30° C. for a time from 5 seconds to 1 minute and heating the mixture to a temperature from 170° to 220° C. for a period of time from 10 seconds to 2 minutes; and (d) a catalyst activator prepared by mixing triethyl aluminum with an alcohol of the formula R"OH wherein R" is a $C_{2-8}$ alkyl radical in a molar ratio of 0.01:1 to 1.2:1.

2. The process according to claim 1 wherein the alcohol is t-butyl alcohol.

3. The process according to claim 2, wherein the activator is prepared by mixing said alcohol and triethyl aluminum in a molar ratio of alcohol to triethyl aluminum of 0.5:1 to 1:1.

4. The process according to claim 3, wherein said precursor further comprises a vanadium oxytrihalide in an amount to provide a molar ratio of vanadium oxytrihalide to Ti from 1:6 to 4:1.

* * * * *